(No Model.)
P. R. KRASEL.
ASH SIFTER.
No. 570,132.  Patented Oct. 27, 1896.
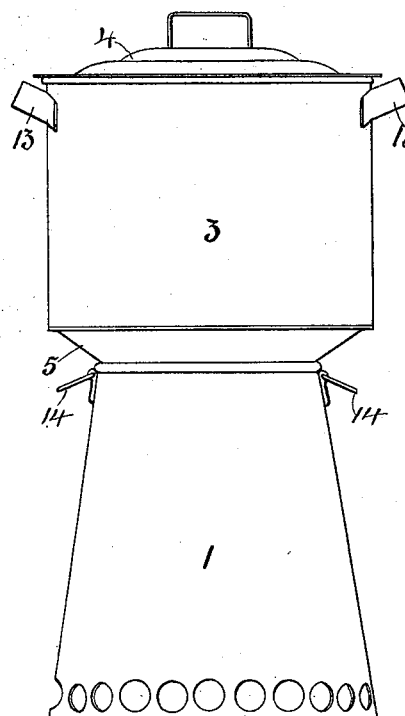
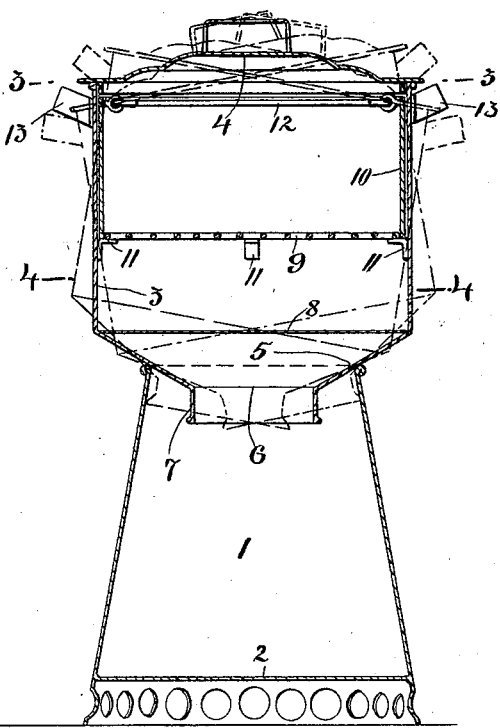
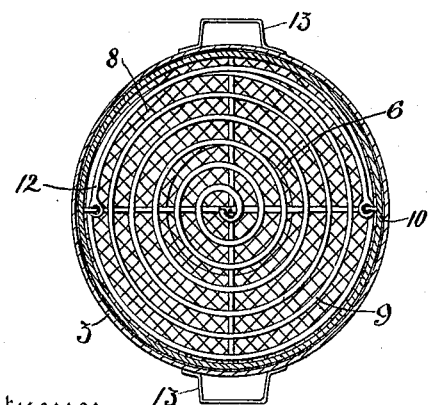
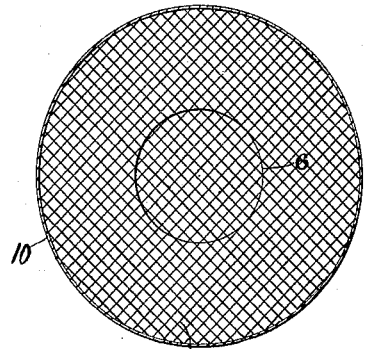
Witnesses  Inventor
Paul R. Krasel
By his Attorney

UNITED STATES PATENT OFFICE.

PAUL RICHARD KRASEL, OF MONTREAL, CANADA.

ASH-SIFTER.

SPECIFICATION forming part of Letters Patent No. 570,132, dated October 27, 1896.

Application filed May 4, 1896. Serial No. 590,146. (No model.) Patented in Canada April 16, 1896, No. 51,995.

*To all whom it may concern:*

Be it known that I, PAUL RICHARD KRASEL, of the city of Montreal, in the district of Montreal and Province of Quebec, Canada, have invented certain new and useful Improvements in Ash-Sifters, (upon which I have already obtained Letters Patent of Canada, No. 51,995, bearing date April 16, 1896;) and I do hereby declare that the following is a full, clear, and exact description of the same.

This invention has for its object to produce a simple, cheap, and more effective ash-sifter than those hitherto furnished, and comprises the following features: first, two screens of different-sized mesh whereby any cinder passing through the larger mesh will be caught by the second screen of finer mesh, and, secondly, the carrying of both screens in a single rocking receptacle, together with various other specific features of construction hereinafter more particularly described, and pointed out in the claims. For full comprehension, however, of the invention reference must be had to the annexed drawings, forming a part of this specification, in which like symbols indicate corresponding parts, and wherein—

Figure 1 is a side elevation of my complete sifter; Fig. 2, a vertical section of same; Fig. 3, a horizontal section on line 3 3, Fig. 2; and Fig. 4, a similar section on line 4 4, Fig. 2.

The sifter comprises, first, a support or base, preferably in the form of a conical receptacle, open at the top and provided with a bottom 2 to receive the ashes, and, secondly, the sifting receptacle proper, consisting of a cylindrical vessel 3, having an open top with suitable cover 4, a hopper-shaped or inclined bottom 5, with central opening 6 and downwardly-projecting cylindrical flange 7 encircling such opening. This vessel 3 contains two screens of different mesh, one, 8, and the finer of which is arranged to extend across same just above the inclined bottom, while the other, 9, of wider mesh or in the form of a wire scroll, is preferably arranged to form the bottom of a removable cylindrical section 10, adapted to be supported upon suitable ledges or projections 11 on the inside face of the vessel 3 above the lower screen. The removable section 10 is provided with a suitable bail or handle 12, as well as the vessel 3 and support, with handles 13 and 14, respectively.

In operation, the ashes to be sifted are placed in the removable section 10 and a rocking motion imparted to the vessel 3, as indicated by dotted lines in Fig. 2, the downwardly-projecting flange 7 hitting upon each movement on either side against the support 1, thus securing a succession of shocks, which is found much more advantageous than any continuous rotary or reciprocal motion that might be free from same. During this single operation the ash is sifted from the larger cinders, leaving them in the removable section, and the smaller cinders, ordinarily wasted, are retained by the finer screen beneath, the fine ashes being held by the lower receptacle or support.

What I claim is as follows:

1. In an ash-sifter, the combination of the open-ended conical supporting-receptacle 1, the cylindrical rocking vessel 3 with suitable cover and hopper-shaped bottom 5 having opening 6 and flange 7; the fine screen 8 and the removable section 10 with screen 9 of larger mesh and suitably supported in said vessel 3, all substantially as and for the purpose set forth.

2. An ash-sifter comprising an open-ended annular support and a cylindrical rocking sifting-receptacle proper with an inverted conical-shaped bottom resting on such support and having an opening therein and provided with a flange, the latter adapted upon the rocking of such receptacle to strike against the support, for the purpose set forth.

PAUL RICHARD KRASEL.

Witnesses:
R. A. C. KIMBER,
FRED. J. SEARS.